(12) United States Patent
Takabayashi et al.

(10) Patent No.: US 10,741,079 B2
(45) Date of Patent: Aug. 11, 2020

(54) ROUTE PREDICTION SYSTEM

(71) Applicant: Mitsubishi Electric Corporation, Tokyo (JP)

(72) Inventors: Yuki Takabayashi, Tokyo (JP); Yasushi Obata, Tokyo (JP); Kyosuke Konishi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 198 days.

(21) Appl. No.: 15/739,650

(22) PCT Filed: Apr. 27, 2016

(86) PCT No.: PCT/JP2016/063161
§ 371 (c)(1),
(2) Date: Dec. 22, 2017

(87) PCT Pub. No.: WO2017/002441
PCT Pub. Date: Jan. 5, 2017

(65) Prior Publication Data
US 2018/0182245 A1    Jun. 28, 2018

(30) Foreign Application Priority Data
Jul. 2, 2015 (WO) .................. PCT/JP2015/069131

(51) Int. Cl.
*G08G 1/16* (2006.01)
*H04W 4/44* (2018.01)
*G08G 1/133* (2006.01)

(52) U.S. Cl.
CPC ............. *G08G 1/166* (2013.01); *G08G 1/133* (2013.01); *G08G 1/16* (2013.01); *G08G 1/164* (2013.01); *H04W 4/44* (2018.02)

(58) Field of Classification Search
CPC .......... G06F 17/18; G08G 1/166; G08G 1/16; G08G 1/164; H04W 4/44
(Continued)

(56) References Cited

U.S. PATENT DOCUMENTS

2008/0303696 A1    12/2008  Aso et al.
2009/0024357 A1*    1/2009  Aso ...................... B60W 30/10
                                                    702/181
(Continued)

FOREIGN PATENT DOCUMENTS

EP    2093741 A1    8/2009
EP    2851886 A1    3/2015
(Continued)

OTHER PUBLICATIONS

International Search Report issued in PCT/JP2016/063161; dated Jul. 19, 2016.
(Continued)

*Primary Examiner* — Isaac G Smith
(74) *Attorney, Agent, or Firm* — Studebaker & Brackett PC

(57) ABSTRACT

The route prediction system according to the invention includes a measurement unit to measure an area including a host vehicle and other moving vehicles, a vehicle detection unit to detect the host vehicle and at least two of the surrounding vehicles having collision possibilities on the basis of observation results observed by the observation unit, a hypothesis generation unit to generate plural hypotheses for the at least two of the surrounding vehicles detected by the vehicle detection unit to avoid collision, a likelihood calculation unit to calculate a likelihood indicating probability of occurrence of each of the plural hypotheses generated by the hypothesis generation unit, and a predicted route analysis unit to analyze, on the basis of the likelihood (Continued)

calculated by the likelihood calculation unit, predicted routes of the at least two of the surrounding vehicles, and output the analysis result. With such a configuration, in a case where plural vehicles may collide in future, predicted routes of the plural surrounding vehicles can be calculated without contradiction, improving performance on predicting the routes of the surrounding vehicles.

23 Claims, 13 Drawing Sheets

(58) Field of Classification Search
USPC .......................................................... 701/301
See application file for complete search history.

(56) References Cited

U.S. PATENT DOCUMENTS

| | | | |
|---|---|---|---|
| 2014/0379233 A1* | 12/2014 | Chundrlik, Jr. | B60T 8/171 701/70 |
| 2015/0239472 A1* | 8/2015 | Sudou | B60W 30/16 702/96 |

FOREIGN PATENT DOCUMENTS

| | | |
|---|---|---|
| JP | 3714258 B2 | 11/2005 |
| JP | 4353192 B2 | 10/2009 |
| JP | 2010-033352 A | 2/2010 |
| JP | 5250290 B2 | 7/2013 |
| JP | 2014-241036 A | 12/2014 |

OTHER PUBLICATIONS

The extended European search report issued by the European Patent Office dated Jan. 28, 2019, which corresponds lo European Patent Application No. 16817551.1 and is related to U.S. Appl. No. 15/739,650.

An Office Action issued by the State Intellectual Property Office of the People's Republic of China dated Apr. 2, 2020, which corresponds to Chinese Patent Application No. 201680037219.6 and is related to U.S. Appl. No. 15/739,650 with English language translation.

\* cited by examiner

- VEHICLES A AND B COLLIDE
- VEHICLES C AND E COLLIDE

ROUTE PREDICTION SYSTEM

TECHNICAL FIELD

The present invention relates to a route prediction system that predicts traveling routes of a moving body.

BACKGROUND ART

Recently, techniques for predicting safe routes to avoid collisions between moving bodies have been required in various fields including vehicle driving support systems and air traffic controls. With respect to vehicle driving support systems, for example, such a technique is developed that acquires positions of obstacles, such as vehicles and still objects around a host vehicle, by sensors installed in the host vehicle such as a millimeter wave radar, a laser radar, and a camera, determines collision risks from relative distances and relative speeds between the host vehicle and the obstacles, and then controls the host vehicle to prevent collisions. Further, as a more advanced technique, an automatic driving technique is being developed that recognizes surrounding environment by such sensors, automatically operates a steering wheel, a brake, or the like, without driver's operation, to reach the destination.

Patent document 1 discloses a method of generating routes and evaluating control variables of the host vehicle in consideration of interaction between plural vehicles. However, because the optimum predicted route is calculated on the basis of predetermined control rules, if there is a surrounding vehicle that does not follow the predetermined control rules, the predicated route may be erroneous. In addition, because sensor errors are not considered when positions of surrounding vehicles are observed, if the sensor errors are influential, the predicted route may be erroneous. Furthermore, there are many parameters to be set, such as a predicted speed of each of the surrounding vehicles given as a parameter; this leads to a concern that the design is complicated.

Patent document 2 discloses a method where plural predicted routes of vehicles are generated in advance, with respect to the generated predicted routes, degrees of interference of the predicted routes between the host vehicle and each of the surrounding vehicles are calculated, and thereby the route that best meets a predetermined selection criterion is selected. However, when calculating predicted routes of all surrounding vehicles, it is necessary to calculate the degree of interference for one predicted route of a surrounding vehicle considering all predicted routes of the other surrounding vehicles; this leads to a concern that the calculation load may be enormous. Further, only a method of calculating predicted routes of the host vehicle is disclosed, while no method of calculating the predicted routes of the surrounding vehicles is disclosed or suggested.

A more specific description will be given of the problem in calculating a predicted route under the circumstances where plural surrounding vehicles are in proximity. As illustrated in FIG. 11, it is assumed that vehicles E and D collide with preceding vehicles C and B, respectively. It is also assumed that the vehicle E has a high probability of moving to the right lane by steering to avoid the collision with the vehicle C, while the vehicle D, having no space on the left lane to move to, has a high probability of avoiding the collision by braking. However, as illustrated in FIG. 12, if the routes are predicted where the vehicle E steers and the vehicle D brakes to avoid the collision with respective preceding vehicles, possibility of collision between the vehicle D and the vehicle E arises. In this case, even if the collision between the vehicles D and E is avoided by re-prediction, another collision possibility arises, so that no predicted route that avoids all possible collisions can be calculated.

PRIOR ART DOCUMENTS

Patent Documents

Patent Document 1: Japanese Patent No. 3714258
Patent Document 2: Japanese Patent No. 4353192

SUMMARY OF INVENTION

Technical Problem

Such a conventional route prediction system predicts a route of a surrounding vehicle by calculating the degree of interference for the predicted route of the surrounding vehicle considering all predicted routes of the other surrounding vehicles. Further, routes of surrounding vehicles are predicted individually. However, the conventional route prediction system does not calculate the degree of interference for a combination of a predicted route of a surrounding vehicle and predicted routes of other surrounding vehicles; thus, mutual movements of plural surrounding vehicles are not considered for a route prediction. As a result, contradictions, such as overlapping of predicted routes of plural surrounding vehicles, sometimes occur; thus, mutual routes of the plural surrounding vehicles cannot be predicted accurately. Since the degree of interference for a predicted route of a surrounding vehicle is calculated considering all predicted routes of the other surrounding vehicles, the calculation load is large.

The present invention is made to solve the above problems, and aims to calculate, in a case where plural vehicles may collide in future, predicted routes of the plural vehicles without contradiction while reducing calculation load.

Solution to Problem

The route prediction system according to the invention includes an observation unit to observe a position of a host vehicle and positions and speeds of vehicles surrounding the host vehicle, a vehicle detection unit to detect the host vehicle and at least two of the surrounding vehicles having collision possibilities on the basis of observation results observed by the observation unit, a hypothesis generation unit to generate plural hypotheses for the at least two of the surrounding vehicles detected by the vehicle detection unit to avoid collision, a likelihood calculation unit to calculate a likelihood indicating probability of occurrence of each of the plural hypotheses generated by the hypothesis generation unit, and a predicted route analysis unit to analyze, on the basis of the likelihood calculated by the likelihood calculation unit, predicted routes of the at least two of the surrounding vehicles, and output the analysis result; the likelihood calculation unit includes a route prediction unit to predict future positions of the at least two of the surrounding vehicles for each of the plural hypotheses generated by the hypothesis generation unit, and a hypothesis likelihood calculation unit to calculate, on the basis of the future positions of the at least two of the surrounding vehicles predicted by the route prediction unit, the likelihood indicating the probability of occurrence of each of the plural hypotheses generated by the hypothesis generation unit.

Advantageous Effects of Invention

According to the invention, in a case where plural surrounding vehicles may collide in future, predicted routes of the plural vehicles can be calculated without contradiction while reducing calculation load.

DESCRIPTION OF EMBODIMENTS

Embodiment 1

An embodiment of the invention will be described below.

Figure 1:
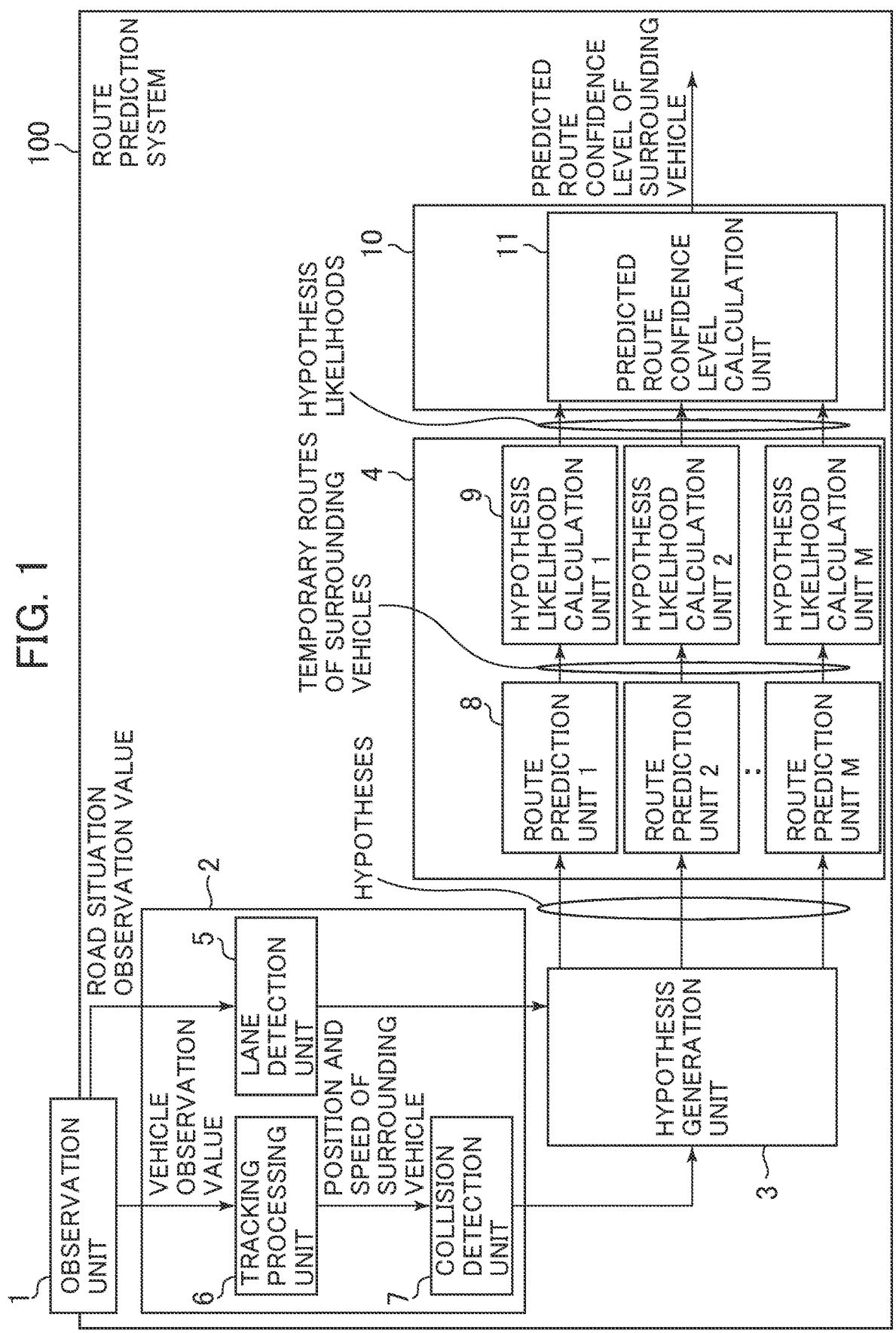
FIG. 1 is a diagram illustrating a configuration of a route prediction system 100 according to Embodiment 1 of the invention.

FIG. 1 is a configuration diagram illustrating a route prediction system 100 according to Embodiment 1. As illustrated in FIG. 1, the route prediction system 100 according to the embodiment includes an observation unit 1, a vehicle detection unit 2, a hypothesis generation unit 3, a likelihood calculation unit 4, and a predicted route analysis unit 10. The observation unit 1 measures a position of a host vehicle and positions and speeds of surrounding vehicles and pedestrians using, for example, sensors, such as a millimeter wave radar, a laser radar, an optical camera, and an infrared camera, and a communication device that receives GPS positions of the surrounding vehicles and the pedestrians. The vehicle detection unit 2 has a function of detecting the host vehicle and at least two surrounding vehicles having collision possibilities on the basis of the observation results observed by the observation unit 1, and includes a lane detection unit 5, a tracking processing unit 6, and a collision detection unit 7. The hypothesis generation unit 3 has a function of generating plural hypotheses for the two surrounding vehicles detected by the vehicle detection unit 2 to avoid collisions. The likelihood calculation unit 4 has a function of calculating a likelihood indicating probability of occurrence of each hypothesis generated by the hypothesis generation unit 3, and includes a route prediction unit 8 and a hypothesis likelihood calculation unit 9. The predicted route analysis unit 10 has a function of analyzing an appropriate predicted route on the basis of the likelihood calculated by the likelihood calculation unit 4.

Processing circuitry embodies each function of the observation unit 1, the vehicle detection unit 2, the hypothesis generation unit 3, the likelihood calculation unit 4, the lane detection unit 5, the tracking processing unit 6, the collision detection unit 7, the route prediction unit 8, the hypothesis likelihood calculation unit 9, and the predicted route analysis unit 10 in the route prediction system 100 described in Embodiment 1. The processing circuitry may be dedicated hardware or a CPU (also referred to as a central processing unit, a processing unit, a computation unit, a microprocessor, a microcomputer, a processor, or a DSP) that executes a program stored in a memory.

Figure 2:
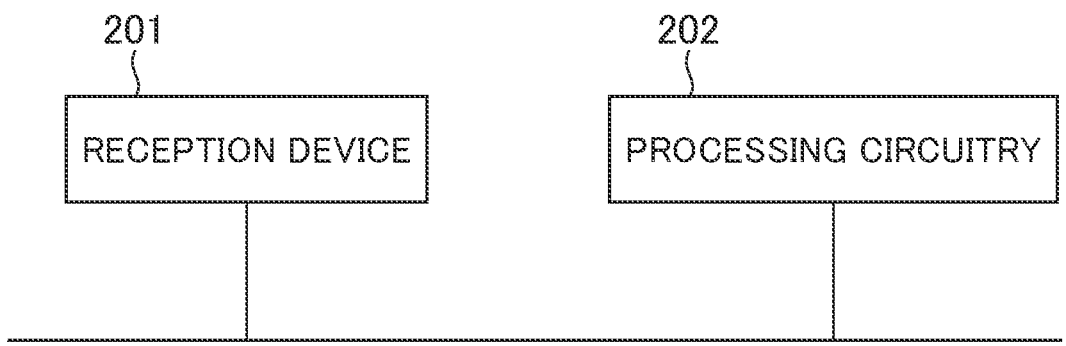
FIG. 2 is a diagram illustrating an example of hardware configuration of the route prediction system 100 according to Embodiment 1 of the invention.

In a case where the processing circuitry is dedicated hardware, the route prediction system 100 includes, as illustrated in FIG. 2, a reception device 201 including the observation unit 1, and processing circuitry 202. The processing circuitry 202 corresponds to, for example, a single circuit, multiple circuits, a programmed processor, multiple programmed processors, an Application Specific Integrated Circuit (ASIC), a Field Programmable Gate Array (FPGA), or a combination thereof. Each function of the observation unit 1, the vehicle detection unit 2, the hypothesis generation unit 3, the likelihood calculation unit 4, the lane detection unit 5, the tracking processing unit 6, the collision detection unit 7, the route prediction unit 8, the hypothesis likelihood calculation unit 9, and the predicted route analysis unit 10 may be embodied by corresponding processing circuitry, or may be embodied by integrated processing circuitry.

Figure 3:
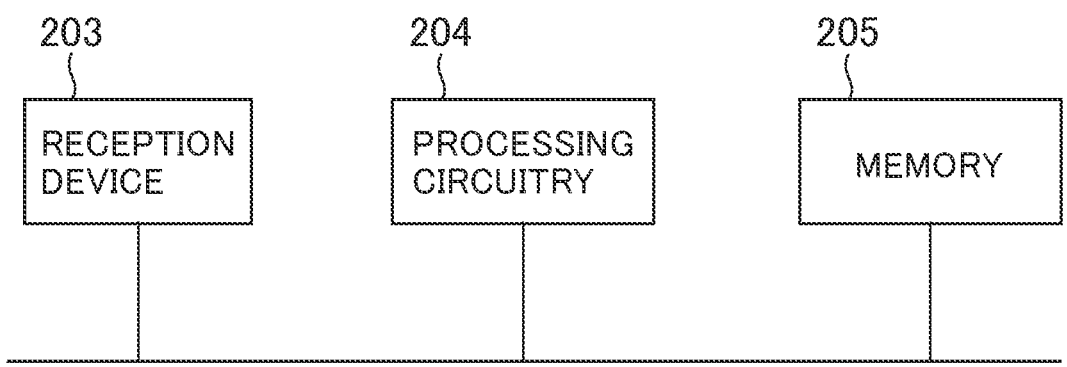
FIG. 3 is a diagram illustrating another example of hardware configuration of the route prediction system 100 according to Embodiment 1 of the invention.

In a case where the processing circuitry is a CPU, the route prediction system 100 includes, as illustrated in FIG. 3, a reception device 203, processing circuitry 204, and a memory 205. The functions of the observation unit 1, the vehicle detection unit 2, the hypothesis generation unit 3, the likelihood calculation unit 4, the lane detection unit 5, the tracking processing unit 6, the collision detection unit 7, the route prediction unit 8, the hypothesis likelihood calculation unit 9, and the predicted route analysis unit 10 are embodied by software, firmware, or a combination of software and firmware. The software and the firmware are written as programs, and stored in the memory. The processing circuitry 204 reads out and executes the programs to embody the function of each unit. An example of the programs can be represented by steps S101 to S108 illustrated in FIG. 4 to be described later. In other words, the programs make a computer to execute procedures and methods of the observation unit 1, the vehicle detection unit 2, the hypothesis generation unit 3, the likelihood calculation unit 4, the lane detection unit 5, the tracking processing unit 6, the collision detection unit 7, the route prediction unit 8, the hypothesis likelihood calculation unit 9, and the predicted route analysis unit 10. Here, the memory 205 corresponds to, for example, a nonvolatile or volatile semiconductor memory such as a RAM, a ROM, a flash memory, an EPROM, and an EEPROM, and a magnetic disk, a flexible disk, an optical disk, a compact disk, a mini disk, and a DVD.

Note that the functions of the observation unit 1, the vehicle detection unit 2, the hypothesis generation unit 3, the likelihood calculation unit 4, the lane detection unit 5, the tracking processing unit 6, the collision detection unit 7, the route prediction unit 8, the hypothesis likelihood calculation unit 9, and the predicted route analysis unit 10 may be embodied partly by dedicated hardware, and partly by software or firmware. For example, the function of the observation unit 1 may be embodied by processing circuitry as dedicated hardware, and the functions of the vehicle detection unit 2, the hypothesis generation unit 3, the likelihood calculation unit 4, the lane detection unit 5, the tracking processing unit 6, the collision detection unit 7, the route prediction unit 8, the hypothesis likelihood calculation unit 9, and the predicted route analysis unit 10 may be embodied by processing circuitry that reads out and executes the programs stored in the memory.

In this manner, the processing circuitry can embody the above-described functions by means of hardware, software, firmware, or a combination thereof.

Figure 4:
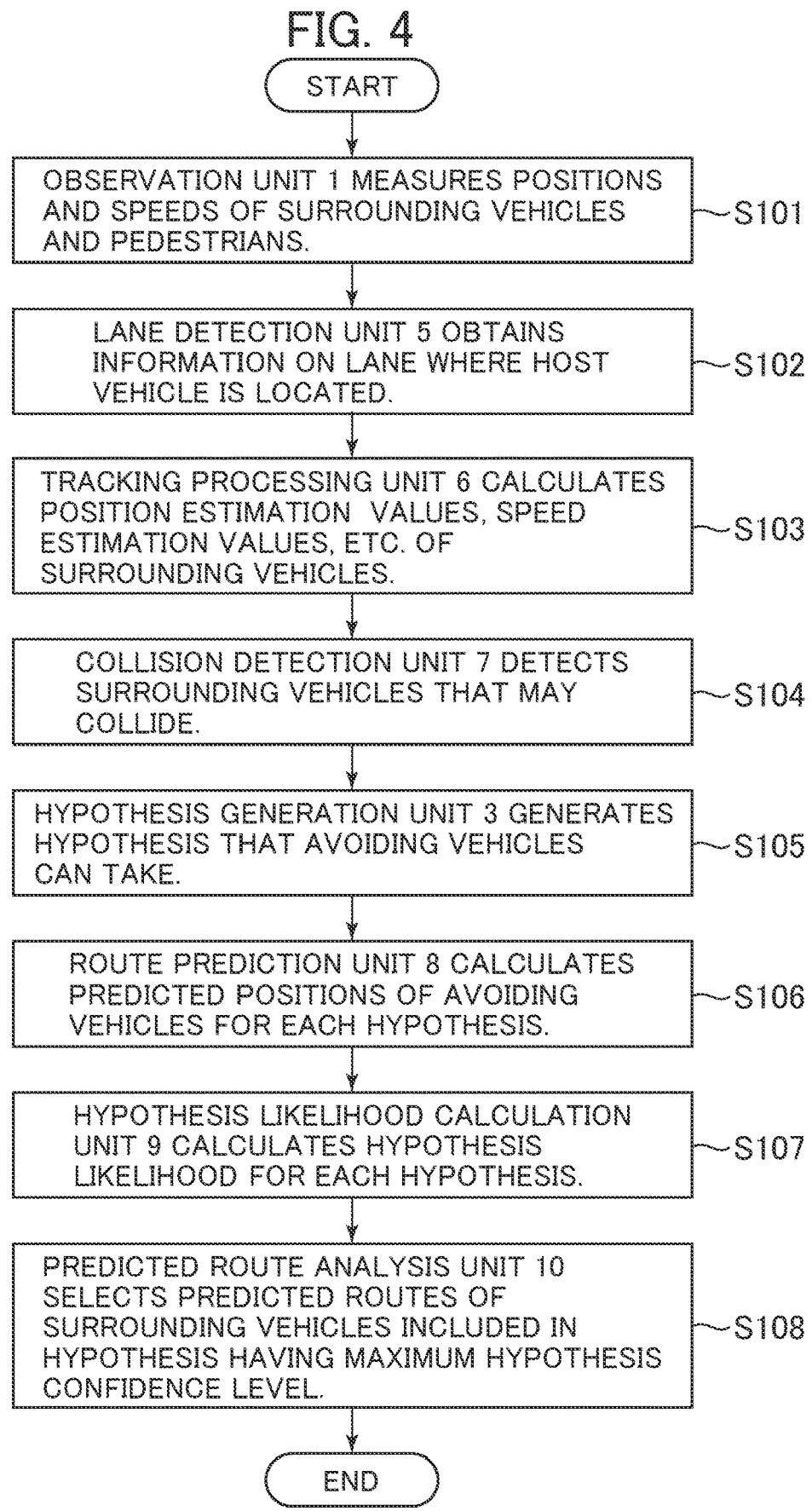
FIG. 4 is a flowchart illustrating processing in the route prediction system 100 according to Embodiment 1 of the invention.

FIG. 4 is a flowchart illustrating processing in the route prediction system 100 according to Embodiment 1 of the invention. The operation of the route prediction system 100 will be described referring to FIG. 4. The observation unit 1 in the route prediction system 100 in FIG. 1 observes an area including the host vehicle and other moving vehicles to measure the positions and speeds of surrounding vehicles and pedestrians, using sensors such as a millimeter wave radar, a laser radar, an optical camera, and an infrared camera, and a communication device or the like that receives GPS positions of surrounding vehicles and pedestrians (S101). The lane detection unit 5 in the vehicle detection unit 2 recognizes white lines in a camera image or the like to obtain information on the lane where the host vehicle is located (S102). The tracking processing unit 6 in the vehicle detection unit 2 calculates, on the basis of the positions and speeds obtained by the sensors, and through tracking processing, estimated values of the positions and speeds of the surrounding vehicles, and estimated error covariance matrixes of the positions and speeds (S103).

The collision detection unit 7 in the vehicle detection unit 2 detects surrounding vehicles that may collide with each other (S104). The detection may be performed on the basis of the concept of a Time To Collision (TTC), for example. A TTC is defined by Equation (1), and vehicles with a TTC equal to or less than a threshold value are detected as vehicles having collision possibilities. Here, a vehicle i is running on the same lane as a vehicle j, and the vehicle i is a preceding vehicle of the surrounding vehicle j.

$$TTC = \frac{(\hat{y}_{s,k}^{(i)} - \hat{y}_{s,k}^{(j)})}{(\dot{\hat{y}}_{s,k}^{(i)} - \dot{\hat{y}}_{s,k}^{(j)})} \quad (1)$$

$\hat{y}_{s,k}^{(i)}$: estimated position of surrounding vehicle i in longitudinal direction at sampling time k.

$\dot{\hat{y}}_{s,k}^{(i)}$: estimated speed of surrounding vehicle i in longitudinal direction at sampling time k.

$\hat{y}_{s,k}^{(j)}$: estimated position of surrounding vehicle j in longitudinal direction at sampling time k.

$\dot{\hat{y}}_{s,k}^{(j)}$: estimated speed of surrounding vehicle j longitudinal direction at sampling time k.

An alternative method may be applied where a predetermined region is set around the host vehicle and a vehicle whose predicted position after one to N steps is in the predetermined region is detected and regarded as a target vehicle. Here, N predicted positions up to N steps ahead are calculated as in Equation (2). Equations (2) to (5) are prediction equations based on a motion model (hereinafter, a constant speed motion model) where a vehicle runs at a constant current speed. However, not limited to the constant speed motion model, the prediction may be based on a constant acceleration motion model depending on a driving situation.

$$\hat{x}_{p,k+N}^{(i)} = \Phi_N \hat{x}_{s,k}^{(i)} \quad (2)$$

$$\hat{x}_{s,k}^{(i)} = \begin{bmatrix} \hat{x}_{s,k}^{(i)} & \hat{y}_{s,k}^{(i)} & \dot{\hat{x}}_{s,k}^{(i)} & \dot{\hat{y}}_{s,k}^{(i)} \end{bmatrix}^T \quad (3)$$

$$\hat{x}_{p,k+N}^{(i)} = \begin{bmatrix} \hat{x}_{p,k+N}^{(i)} & \hat{y}_{p,k+N}^{(i)} & \dot{\hat{x}}_{p,k+N}^{(i)} & \dot{\hat{y}}_{p,k+N}^{(i)} \end{bmatrix}^T \quad (4)$$

$$\Phi_N = \begin{bmatrix} I_{2\times 2} & N \cdot \Delta T \cdot I_{2\times 2} \\ 0 \cdot I_{2\times 2} & I_{2\times 2} \end{bmatrix} \quad (5)$$

$\hat{X}_{s,k}^{(i)}$: Estimated state vector of surrounding vehicle i at sampling time k $\hat{X}_{p,k+N}^{(i)}$: Predicted state vector of surrounding vehicle i after N steps at sampling time k $\hat{x}_{s,k}^{(i)}$: Estimated position of surrounding vehicle i in lateral direction at sampling time k.

$\dot{\hat{x}}_{s,k}^{(i)}$: Estimated speed of surrounding vehicle i in lateral direction at sampling time k.

$\hat{x}_{p,k+N}^{(i)}$: Predicted position of surrounding vehicle i after N steps in lateral direction at sampling time k.

$\dot{\hat{x}}_{p,k+N}^{(i)}$: Predicted speed of surrounding vehicle i after N steps in lateral direction at sampling time k.

$\hat{y}_{p,k+N}^{(i)}$: Predicted position of surrounding vehicle i after N steps in longitudinal direction at sampling time k.

$\dot{\hat{y}}_{p,k+N}^{(i)}$: Predicted speed of surrounding vehicle i after N steps in longitudinal direction at sampling time k.

$\Delta T$: Step duration $I_{L\times L}$: Unit matrix of L rows and L columns

Figure 5:
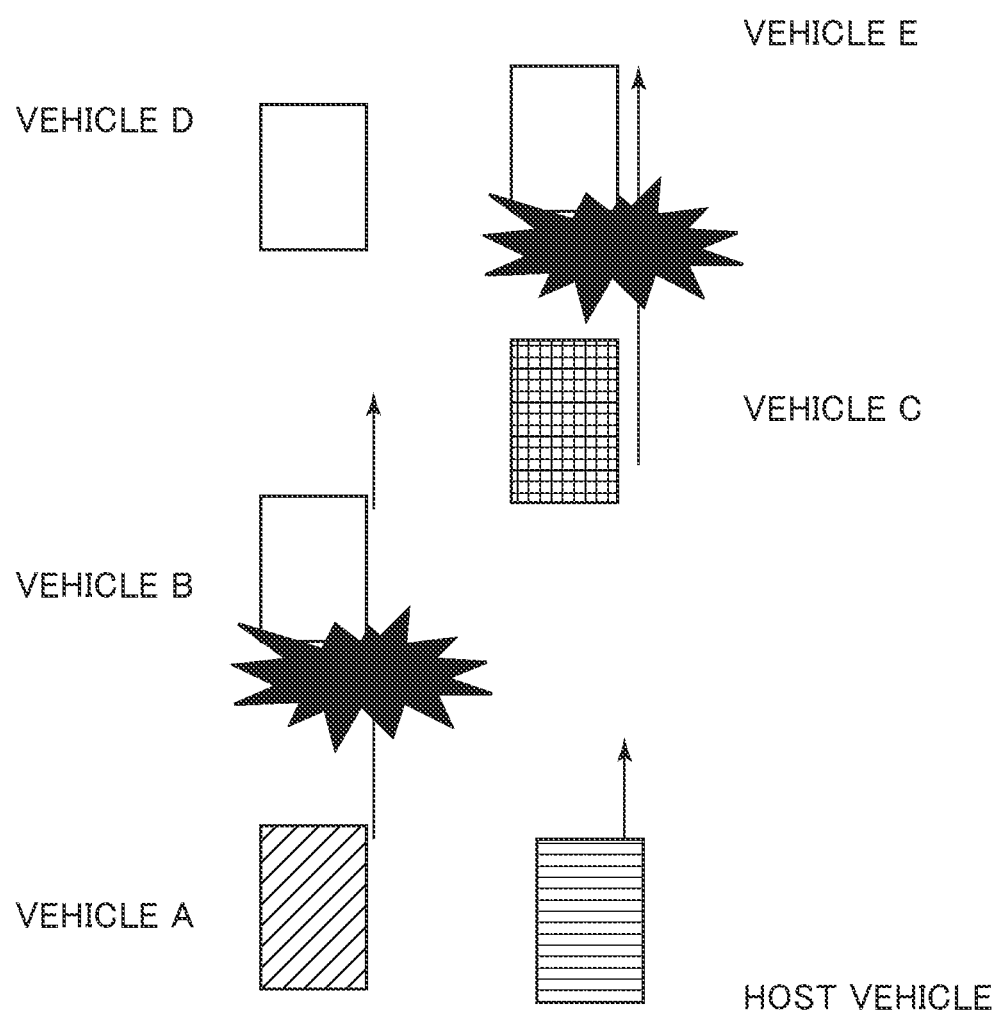
FIG. 5 is an example of vehicle situations dealt with in a hypothesis generation unit 3 according to Embodiment 1 of the invention.
Figure 6:
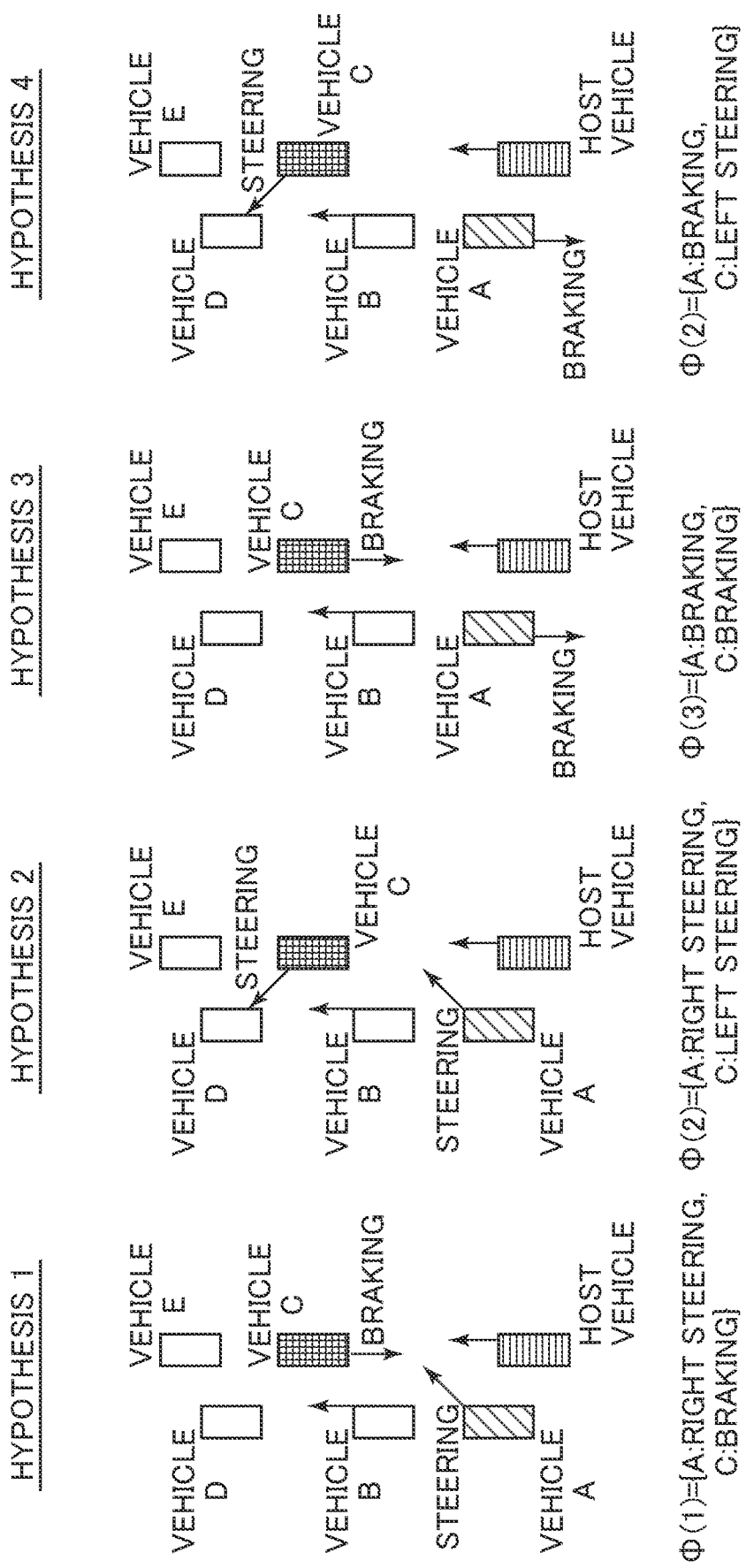
FIG. 6 is a set of hypotheses of collision avoidance dealt with in the hypothesis generation unit 3 according to Embodiment 1 of the invention.

When the collision detection unit 7 detects plural collision possibilities and at least two surrounding vehicles having collision possibilities, the hypothesis generation unit 3 performs the following processing. First, the hypothesis generation unit 3 selects at least two surrounding vehicles (hereinafter, avoiding vehicles) having collision possibilities that will take avoiding actions to avoid the plural collision possibilities mentioned above. Then, a predicted scene (hereinafter, referred to as a hypothesis) is generated with reference to combinations of collision avoidance models that the at least two avoiding vehicles can take (S105). For example, as in FIG. 5, in a case where the host vehicle and vehicles A to E exist, the vehicles A and B collide, and the vehicles C and E collide, in order to avoid the collisions, the following vehicles A and C will take avoiding actions in accordance with the collision avoidance models. As the collision avoidance models, a braking avoidance model, a left steering avoidance model, and a right steering avoidance model may be defined, for example. The braking avoidance model is a model in which collision is avoided by breaking while the lane is kept, and the left/right steering avoidance model is a model in which collision is avoided by inputting a steering amount for lane change to the left/right. In the models, the braking amount or the steering amount is set so as not to exceed a predetermined limit value. Since there are two driving lanes in FIG. 5, four hypotheses are generated from the combinations of the collision avoidance models of the vehicle A and the vehicle C as illustrated in FIG. 6. Since there are two driving lanes in FIG. 6, for the vehicle A, only the right steering model and the braking model are dealt with; the left steering model is not dealt with because it contradicts the actual routes. For the vehicle C, only the left steering model and the braking model are dealt with, and the right steering model is not dealt with because it contradicts the actual routes. In this way, the models that contradict the actual routes are excluded, and only the models without contradiction are dealt with. In FIG. 6, all combinations of the models used for the vehicles A and C are dealt with; if a combination of the models dealt with for the vehicles A and C contradicts with the actual routes, the combination can be excluded. Consequently, in the present embodiment, combinations of models that the vehicles A and C can take can be dealt with as possible predicted scenes (hypotheses). By storing hypotheses in a memory or the like in advance, a hypothesis suitable for an arrangement pattern of the avoiding vehicles can be retrieved by reading it out from the memory.

The prior arts describe no example of generating a combination of avoidance models of at least two surrounding vehicles having collision possibilities, and calculate the degree of interference for each surrounding vehicle with the other surrounding vehicles; thus, the degree of interference needs to be calculated even for such a contradictory state where the routes of plural surrounding vehicles overlap each other. In the embodiment, however, a combination of avoidance models of at least two surrounding vehicles is used; thus, it is possible to generate a hypothesis that is limited only to combinations of routes that the at least two of the surrounding vehicles can mutually take. Consequently, calculation processing is performed only for combinations of necessary routes without causing contradiction such as overlapping of the routes that the at least two surrounding vehicles can take; this enables reduction in the amount of the calculation processing.

The route prediction unit 8 in the likelihood calculation unit 4 calculates, for each hypothesis illustrated in FIG. 6, predicted positions of the avoiding vehicles up to N steps ahead, on the basis of the collision avoidance models, as their predicted future positions (S106). It also calculates predicted positions of vehicles other than the avoiding vehicles up to N steps ahead as their predicted future positions, assuming that the vehicles move at constant speeds as described for the collision detection unit 7. However, there is no need to recalculate the predicted position that has been calculated by the collision detection unit 7. For example, a predicted position calculation method based on a collision avoidance model will be described. Temporary routes (predicted positions up to N steps ahead) are calculated as in Equation (6) on the basis of braking acceleration of the braking avoidance model.

$$\hat{x}^{(i)}_{p,k+N} = F(a_b) = \Phi_N x^{(i)}_k + \begin{bmatrix} 0 \\ -\frac{1}{2}(N \cdot \Delta T)^2 \cdot a_b \\ 0 \\ -N \cdot \Delta T \cdot a_b \end{bmatrix} \quad (6)$$

$$x^{(i)}_k = [\, x^{(i)}_k \quad y^{(i)}_k \quad \dot{x}^{(i)}_k \quad \dot{y}^{(i)}_k \,]^T \quad (7)$$

$$\hat{x}^{(i)}_{p,k+N} = [\, \hat{x}^{(i)}_{p,k+N} \quad \hat{y}^{(i)}_{p,k+N} \quad \hat{\dot{x}}^{(i)}_{p,k+N} \quad \hat{\dot{y}}^{(i)}_{p,k+N} \,]^T \quad (8)$$

: Braking acceleration

Temporary routes can also be calculated for the left/right steering avoidance model. Since a predicted position of a vehicle responding to steering depends on vehicle parameters such as the vehicle weight, the position of the center of gravity of the vehicle body, and the yaw moment of inertia, if some vehicle parameters are known, they are set in advance to calculate the predicted position. If there is an unknown vehicle parameter, a parameter estimated by a known learning algorithm or the like may be used.

The hypothesis likelihood calculation unit 9 in the likelihood calculation unit 4 calculates a hypothesis likelihood for each hypothesis on the basis of the temporary routes calculated by the route prediction unit 8 (S107). In the calculation of the hypothesis likelihood, likelihood evaluation is performed using, for example, a collision time. Equation (9) defines a prediction step number $n_{min}$ (i, j) at which vehicles i and j are closest, and Equation (10) defines a distance $R_{min}$ (i, j) between the vehicles i and j.

$$n_{min}(i, j) = \operatorname*{argmin}_{n} \left( \sqrt{\left(\hat{x}^{(i)}_{p,k+n} - \hat{x}^{(j)}_{p,k+n}\right)^2 + \left(\hat{y}^{(i)}_{p,k+n} - \hat{y}^{(j)}_{p,k+n}\right)^2} \right) \quad (9)$$

$$R_{min}(i, j) = \sqrt{\left(\hat{x}^{(i)}_{p,k+n_{min}} - \hat{x}^{(j)}_{p,k+n_{min}}\right)^2 + \left(\hat{y}^{(i)}_{p,k+n_{min}} - \hat{y}^{(j)}_{p,k+n_{min}}\right)^2} \quad (10)$$

If the distance $R_{min}$ (i, j) between the vehicles i and j is a threshold value or smaller, the vehicles i and j are deemed to collide, and the collision time is calculated.

$$T_c(i, j) = \Delta T \cdot n_{min}(i, j) \quad (11)$$

If the distance $R_{min}$ (i, j) between the vehicles i and j exceeds the threshold value, the vehicles are not deemed to collide, and the collision time is set to a fixed value for the maximum prediction step number N or larger.

$$T_c(i, j) = T_{fix} \; (T_{fix} \geq \Delta T \cdot N) \quad (12)$$

Next, the likelihood evaluation value is defined by Equation (13). The left side of the equation (13) is the likelihood of the m-th hypothesis $\Phi_m$, and Z(k) is a sensor observation value at the latest sampling time k. Equation (13) means that the sum of the collision times for all combinations of the surrounding vehicles is calculated. The combinations may be limited only to the two closest vehicles, or may be limited only to the vehicles that are predicted to enter the same lane.

$$P(Z(k) \mid \Phi_m) = \sum_{i,j \in N_{wi}} T_c(i, j) \quad (13)$$

In the calculation of the hypothesis likelihood, the likelihood evaluation may be performed considering sensor errors or errors after tracking processing. First, a collision risk level is calculated on the basis of an estimated error covariance matrix of a position and estimated values of positions and speeds, which are outputted from the tracking processing unit 6. As in Equation (14), a value obtained by normalizing the difference between the predicted positions of the vehicles i and j after n (n=1, . . . , N) steps at the sampling time k with the estimated error covariance matrix, that is, a Mahalanobis squared distance $\varepsilon_{k+n}$, is calculated.

$$\varepsilon_{k+n}(i,j) = \Delta \hat{x}_{k+n}^T (P_{p,k+n}^{(i)} + P_{p,k+n}^{(j)})^{-1} \Delta \hat{x}_{k+n} \quad (14)$$

$$\Delta \hat{x}_{k+n} = [\hat{x}_{p,k+n}^{(i)} - \hat{x}_{p,k+n}^{(j)} \, \hat{y}_{p,k+n}^{(i)} - \hat{y}_{p,k+n}^{(j)}]^T \quad (15)$$

$$P_{p,k+n}^{(tgti)} = \Phi_n P_{s,k}^{(tgti)} \Phi_n^T \quad (16)$$

$P_{s,k}^{(tgti)}$: Smoothed error covariance matrix of target tgti at sampling time k $P_{p,k+n}^{(tgti)}$: Predicted error covariance matrix of target tgti after n steps at sampling time k Equation (17) defines a prediction step number $n_{min}(i, j)$ that minimizes the Mahalanobis squared distance between the vehicles i and j, and Equation (18) defines the minimum Mahalanobis squared distance $\varepsilon_{min}(i, j)$ between the vehicles i and j.

$$n_{min}(i, j) = \underset{n}{\operatorname{argmin}}(\varepsilon_{k+n}(i, j)) \quad (17)$$

$$\varepsilon_{min}(i, j) = \varepsilon_{k+n_{min}}(i, j) \quad (18)$$

Next, the likelihood evaluation value is defined by Equation (19). The right side of Equation (19) means that the sum of the Mahalanobis squared distances for all combinations of the vehicles is calculated. The combinations may be limited only to the two closest vehicles, or may be limited only to the vehicles that are predicted to enter the same lane.

$$P(Z(k) | \Phi_m) = \sum_{i,j \in N_{ki}} \varepsilon_{min}(i, j) \quad (19)$$

Figure 7:
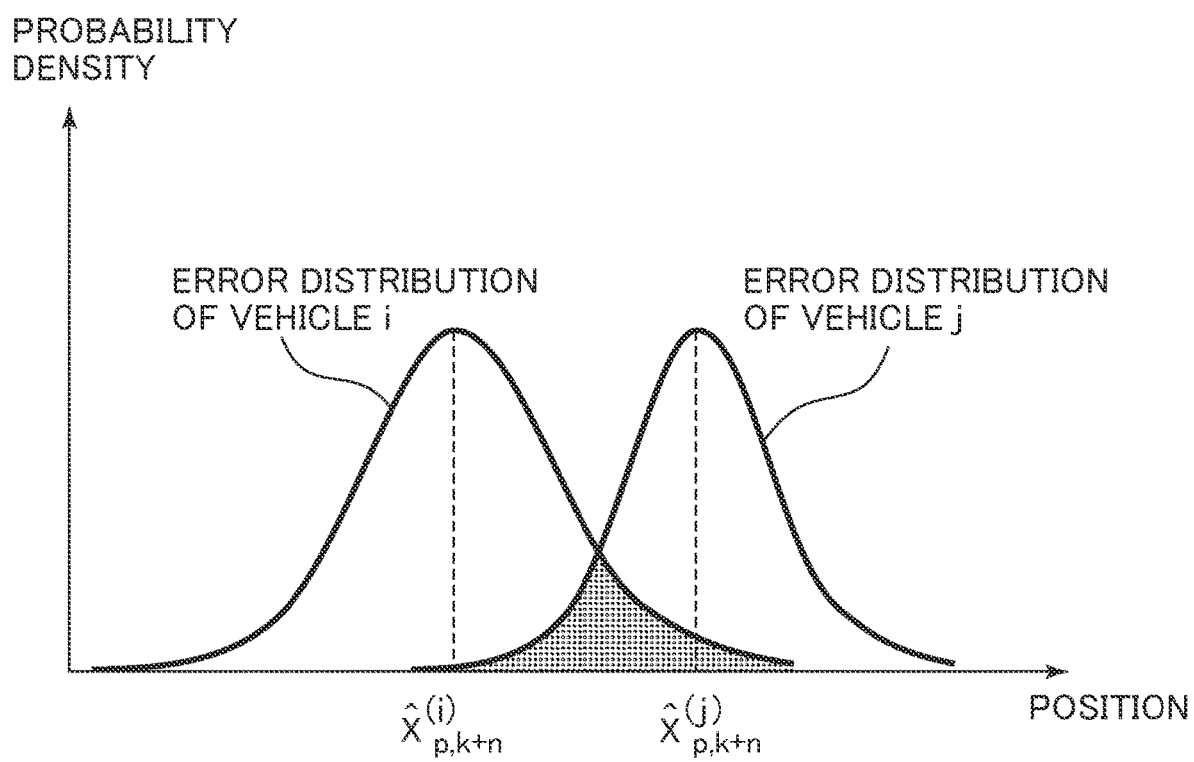
FIG. 7 is probability distributions of vehicles according to Embodiment 1 of the invention.

Further, in the calculation of the hypothesis likelihood, it is also allowed, with regard to the predicted error covariance matrix after n steps, to set an overlap of the predicted error distributions of the vehicles as an index, and use the reciprocal of the magnitude of the overlap. For example, the probability distributions of the vehicles i and j are expressed as in FIG. 7 with the horizontal axis as a position and the vertical axis as a probability density function based on error distributions. As shown in FIG. 7, the magnitude of the overlap corresponds to the range where the error distributions of the vehicles overlap each other in FIG. 7 (the shaded area in FIG. 7). Note that, in FIG. 7, the overlapping range is an area because the position is represented by one dimension for convenience of explanation, but it is a volume in a two-dimensional plane. Here, the likelihood evaluation value may be defined by Equation (20), letting D(i, j) be the magnitude of the overlap of the predicted error distributions of the vehicles i and j and using the reciprocal of $D_{max}(i, j)$ that is the magnitude of the overlap at the prediction step number that makes D(i, j) maximum.

$$P(Z(k) | \Phi_m) = \sum_{i,j \in N_{ki}} \frac{1}{D_{max}(i, j)} \quad (20)$$

Figure 8:
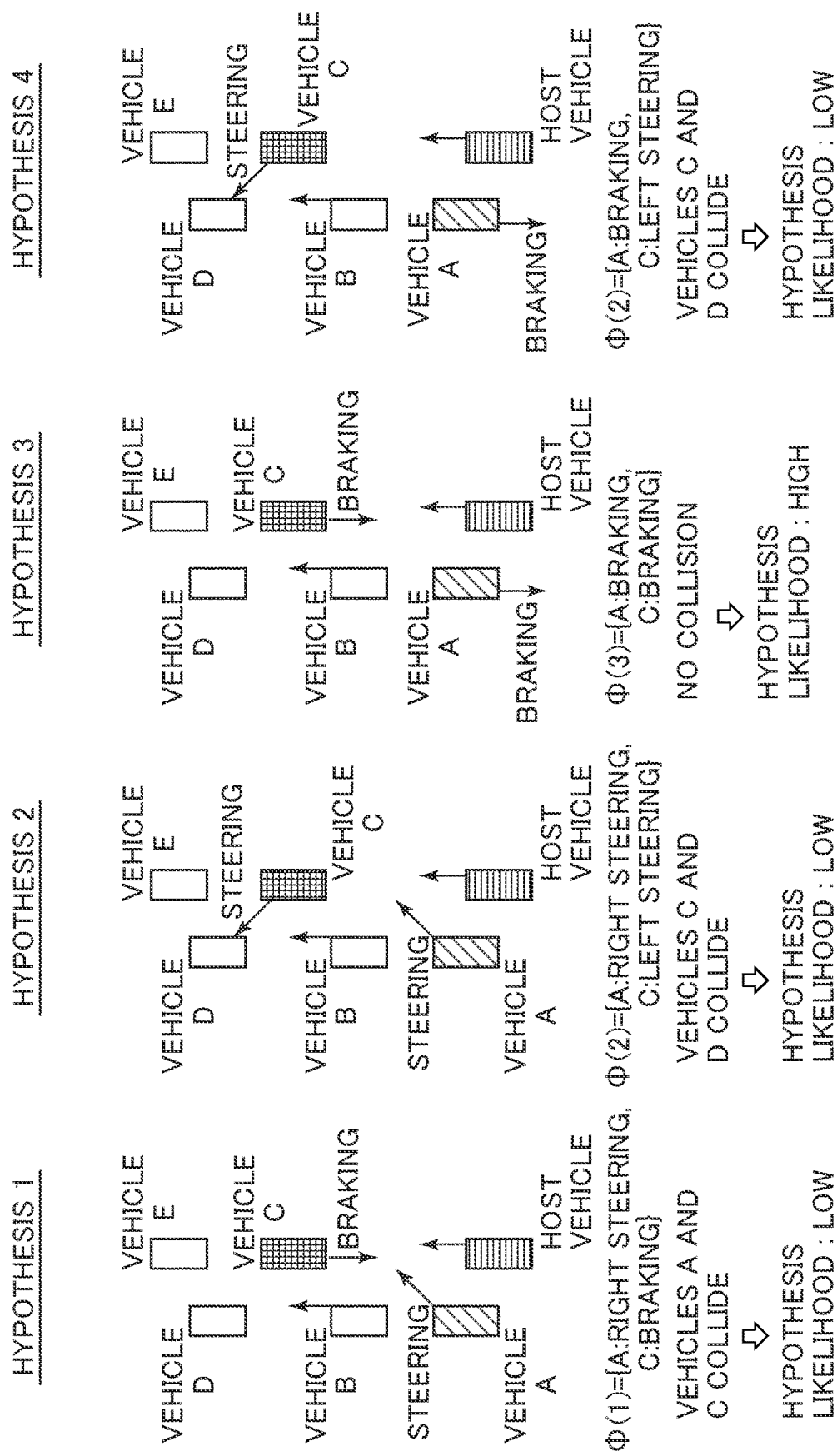
FIG. 8 is a diagram illustrating hypothesis likelihood for each hypothesis according to Embodiment 1 of the present invention.

Here, the output of the hypothesis likelihood calculation unit 9 is the hypothesis likelihood of each hypothesis. FIG. 8 is a diagram illustrating examples of output by the hypothesis likelihood calculation. As illustrated in FIG. 8, the following results are obtained. The vehicles A and C collide in the hypothesis 1, the vehicles C and D collide in the hypothesis 2, and the vehicles C and D collide in the hypothesis 4; thus, the hypothesis likelihoods thereof are low. No collision occurs in the hypothesis 3; thus, the hypothesis likelihood thereof is high.

The predicted route analysis unit 10 first calculates a hypothesis confidence level using Equation (21).

$$P(\Phi_m | Z(k)) = \frac{P(Z(k) | \Phi_m)}{\sum_{m=1}^{M} P(Z(k) | \Phi_m)} \quad (21)$$

As a result, the predicted route confidence level corresponding to each hypothesis can be understood. Using the predicted route confidence level, the predicted route analysis unit 10 can output analysis results of predicted routes in various formats. For example, the predicted routes with the maximum confidence level can selectively be outputted, by selecting predicted routes of surrounding vehicles included in the hypothesis $\Phi_m$ having the maximum hypothesis confidence level (S108). The predicted route analysis unit 10 can also output another format using the confidence level information. In a case of outputting the predicted routes with the maximum confidence level, in the example shown in FIG. 8, the hypothesis 3 has the maximum hypothesis confidence level; thus, the vehicle A selects a predicted route based on steering avoidance, and the vehicle C selects a route based on braking avoidance.

According to Embodiment 1 described above, the route prediction system 100 includes the observation unit 1 to observe positions and speeds of a host vehicle and vehicles surrounding the host vehicle, the vehicle detection unit 2 to detect the host vehicle and at least two of the surrounding vehicles having collision possibilities on the basis of observation results observed by the observation unit 1, the hypothesis generation unit 3 to generate plural hypotheses for the at least two of the surrounding vehicles detected by the vehicle detection unit 2 to avoid collision, the likelihood calculation unit 4 to calculate a likelihood indicating probability of occurrence of each of the plural hypotheses generated by the hypothesis generation unit 3, and the predicted route analysis unit 10 to analyze predicted routes of the at least two of the surrounding vehicles, on the basis of the likelihood calculated by the likelihood calculation unit 4, and output the analysis result. With such a configuration, in a case where plural surrounding vehicles may collide in future, predicted scenes based on the vehicle motions are generated; thus, scenes assumed in reality can be covered without excess or deficiency, and the predicted routes of the plural vehicles can be calculated without contradiction; this improves performance on predicting the routes of the surrounding vehicles. Further, it is not necessary to calculate evaluation values such as degrees of interference for a myriad of routes as in the prior arts, so that the calculation load can be reduced.

According to Embodiment 1, the vehicle detection unit 2 includes the lane detection unit 5 to detect a lane where the host vehicle is located, on the basis of the observation results observed by the observation unit 1, the tracking processing unit 6 to track the vehicles surrounding the host vehicle on the basis of the observation results observed by the observation unit 1, and the collision detection unit 7 to detect, among the surrounding vehicles tracked by the tracking processing unit 6, the at least two of the surrounding vehicles having collision possibilities. With such a configuration, at least two surrounding vehicles having collision possibilities can be detected.

According to Embodiment 1, the likelihood calculation unit 4 includes the route prediction unit 8 to predict future positions of the at least two of the surrounding vehicles for each of the hypotheses generated by the hypothesis generation unit 3, and the hypothesis likelihood calculation unit 9 to calculate the likelihood indicating the probability of occurrence of each of the plural hypotheses generated by the hypothesis generation unit 3, on the basis of the future positions of the at least two of the surrounding vehicles predicted by the route prediction unit 8. With such a configuration, the likelihoods of the predicted routes of at least two surrounding vehicles having collision possibilities can be calculated.

According to Embodiment 1, the predicted route analysis unit 10 selects and outputs the predicted routes of the at least two of the vehicles on the basis of the likelihood calculated by the hypothesis likelihood calculation unit 9. With such a configuration, the predicted routes with the highest possibility of occurrence can be expressed as the prediction result of the route prediction system 100.

Embodiment 2

In Embodiment 1, a format in which the predicted route having the maximum confidence level is selectively outputted from the predicted route analysis unit 10 is disclosed, but it is also possible to output the analysis result in other formats. In Embodiment 2, a case of outputting an analysis result different from that in Embodiment 1 will be described.

Figure 9:
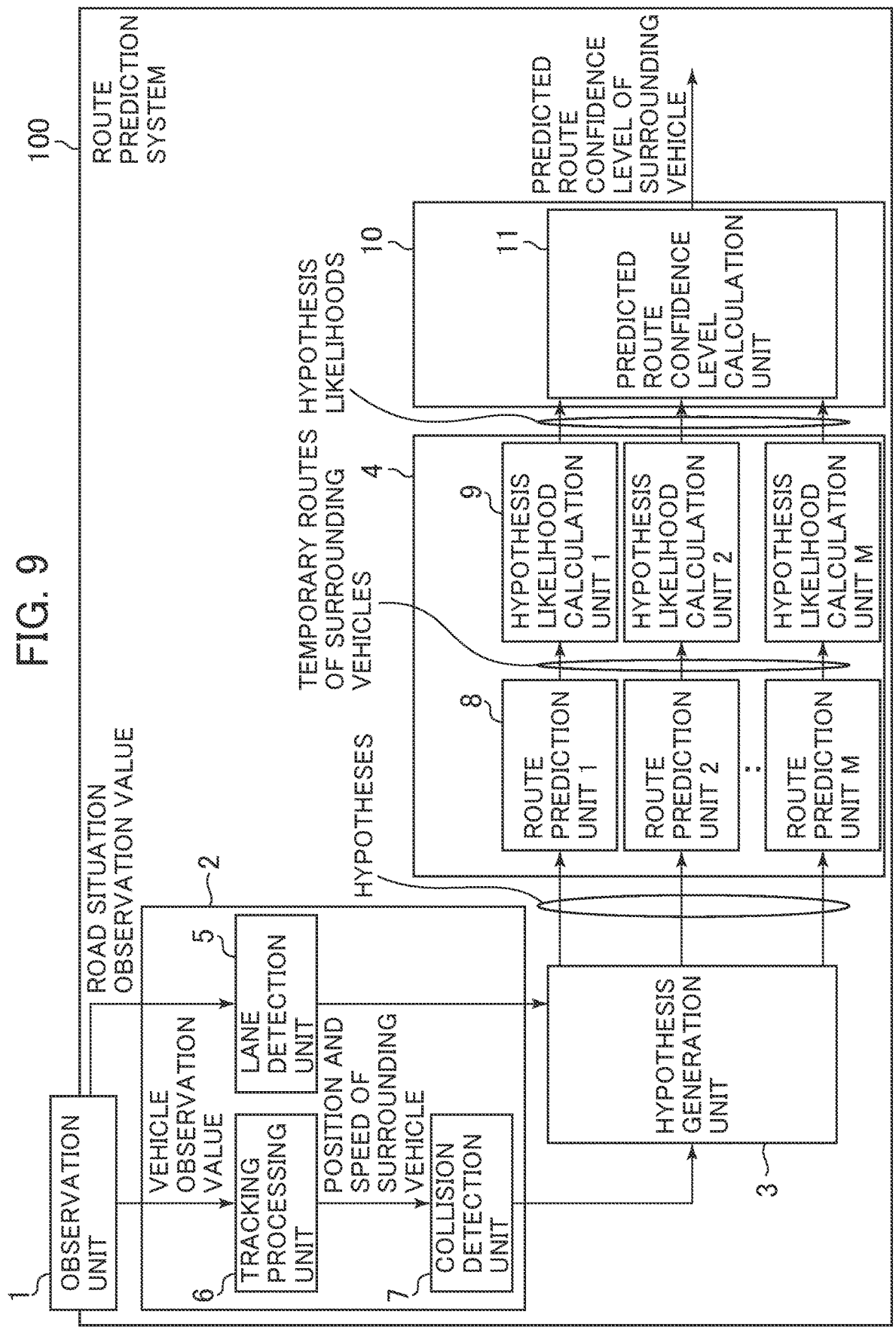
FIG. 9 is a diagram illustrating a configuration of a route prediction system 100 according to Embodiment 2 of the invention.

FIG. 9 is a configuration diagram illustrating a route prediction system 100 according to Embodiment 2. As illustrated in FIG. 9, the route prediction system 100 according to the embodiment includes the observation unit 1, the lane detection unit 5, the tracking processing unit 6, the collision detection unit 7, the hypothesis generation unit 3, the route prediction unit 8, the hypothesis likelihood calculation unit 9, the predicted route analysis unit 10, and a predicted route confidence level calculation unit 11 provided in the predicted route analysis unit 10. A hardware configuration that embodies the function of each unit in the route prediction system 100 illustrated in FIG. 9 is expressed by the configuration in FIG. 2 or FIG. 3 as in Embodiment 1.

The predicted route confidence level calculation unit 11 calculates an index representing probability of occurrence of the predicted route of each vehicle as a predicted route confidence level. For example, the confidence level that a vehicle i takes a predicted route based on a collision avoidance model j is calculated by Equation (22). The left side of Equation (22) is the confidence level that the vehicle i takes the predicted route based on the collision avoidance model j. P $(l_{i,j}|\Phi_m)$ in Equation (23), which is a term related to combination, is set to 1 if the predicted route is included in the hypothesis $\Phi_m$, and 0 if not included.

$$P(l_{i,j} | Z(k)) = \sum_{m=1}^{M} P(Z(k) | \Phi_m) P(l_{i,j} | \Phi_m) \qquad (22)$$

$$P(l_{i,j} | \Phi_m) = \begin{cases} 1 \text{ (if } l_{i,j} \in \Phi_m) \\ 0 \text{ (if } l_{i,j} \notin \Phi_m) \end{cases} \qquad (23)$$

Further, as in Equation (24), a value obtained by normalizing the confidence level adopting the predicted route based on the collision avoidance model j for the vehicle i with the sum of the confidence levels of all collision avoidance models may be a replacement as the predicted route confidence level.

$$P'(l_{i,j} | Z(k)) = \frac{P(l_{i,j} | Z(k))}{\sum_{j \in J} P(l_{i,j} | Z(k))} \qquad (24)$$

Since the other processing is the same as that in Embodiment 1, description thereof will be omitted.

According to Embodiment 2 described above, the predicted route analysis unit 10 includes the predicted route confidence level calculation unit 11 to calculate, on the basis of the likelihood calculated by the likelihood calculation unit 4, a predicted route confidence level indicating probability of occurrence of each of the predicted routes of at least two surrounding vehicles for each of the predicted routes. With such a configuration, instead of determining one predicted route for each vehicle as described in Embodiment 1, a quantitative value indicating probability of occurrence of the predicted route is outputted; this allows a user to understand intuitively. This makes it easier for other systems to use the invention.

Embodiment 3

In the embodiment, a configuration for displaying the output of the route prediction system 100 of Embodiments 1 and 2 on a display unit will be described.

Figure 10:
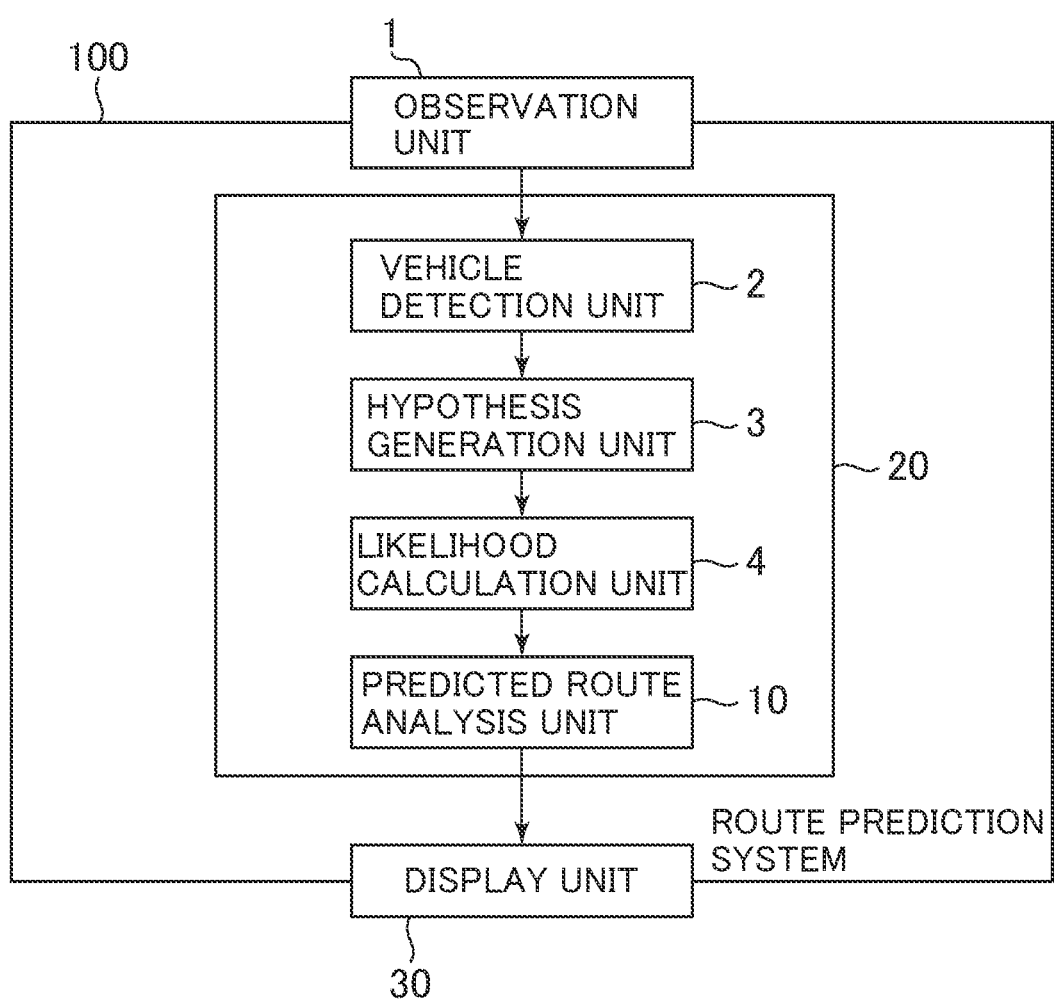
FIG. 10 is a diagram illustrating a configuration of a route prediction system 100 according to Embodiment 3 of the invention.
Figure 11:
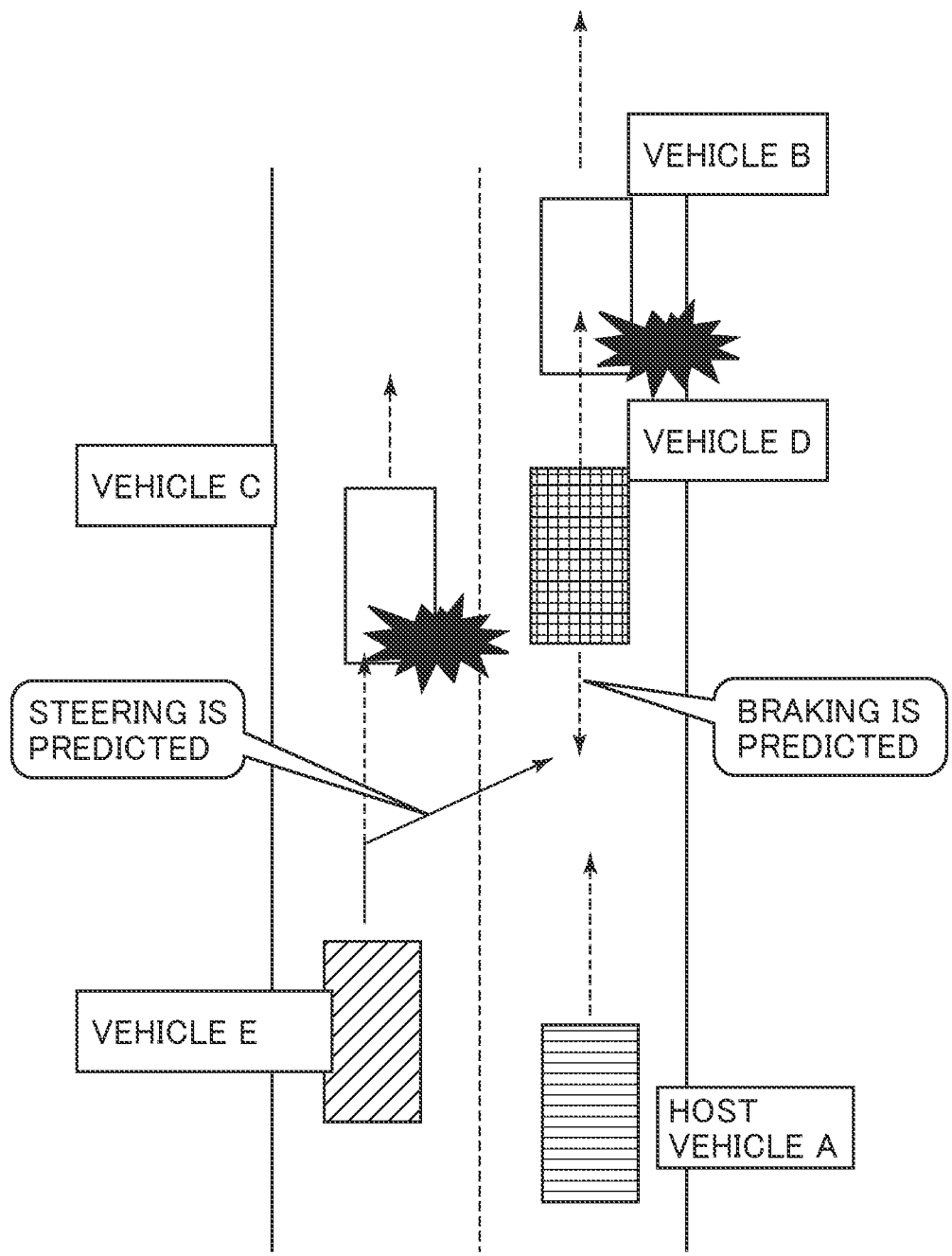
FIG. 11 is an example of a road situation where plural vehicles coexist according to a prior art.
Figure 12:
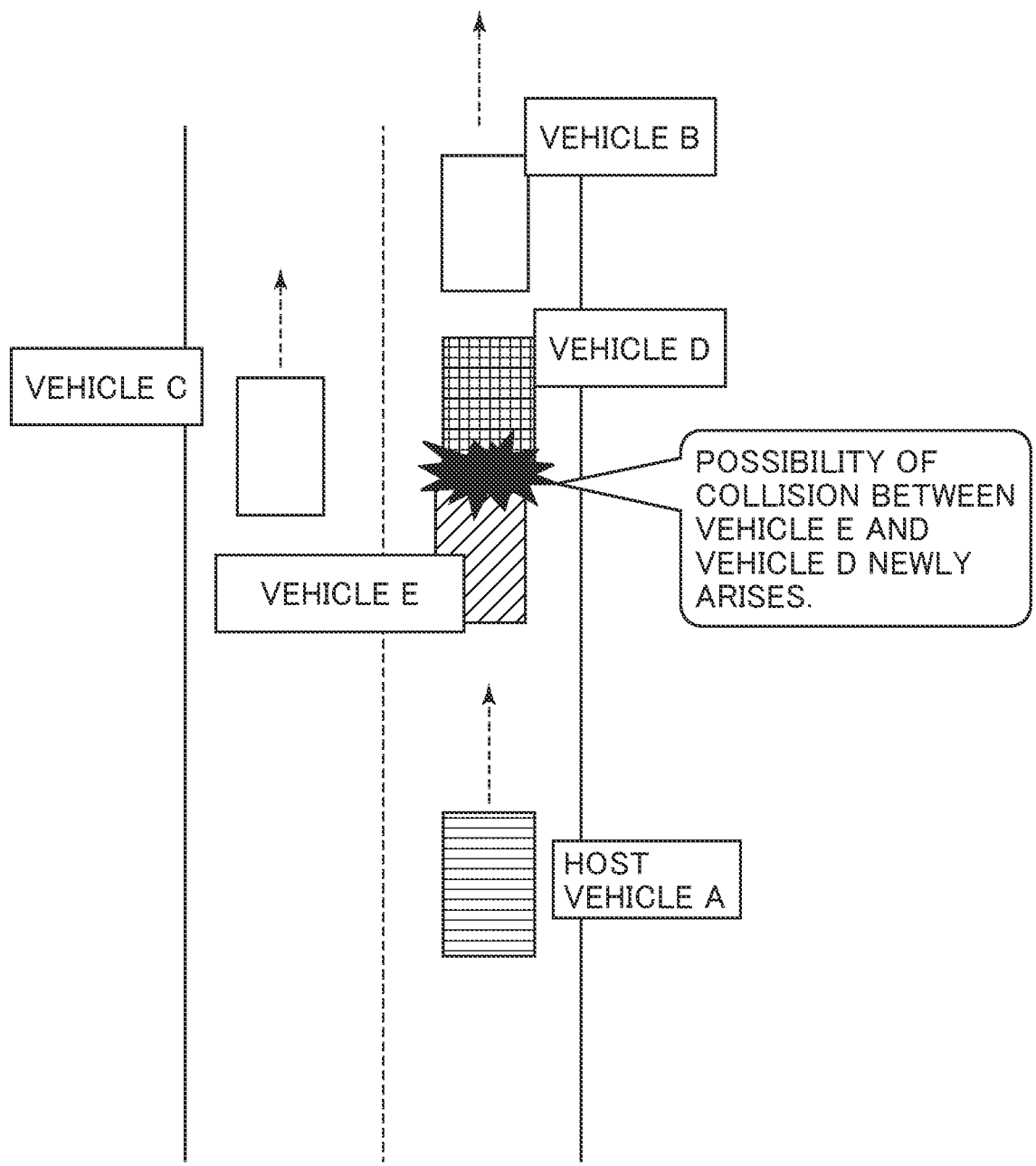
FIG. 12 is an example of an erroneous prediction in a case where avoidance by the plural vehicles is performed according to the prior art.

FIG. 10 is a configuration diagram illustrating a route prediction system 100 according to Embodiment 3. As illustrated in FIG. 10, the route prediction system 100 according to Embodiment 3 includes the observation unit 1, a signal processing unit 20, and a display unit 30; the signal processing unit 20 includes the vehicle detection unit 2, the hypothesis generation unit 3, the likelihood calculation unit 4, and the predicted route analysis unit 10, which are described in Embodiments 1 and 2. A hardware configuration that embodies the function of each unit in the route prediction system 100 illustrated in FIG. 10 is expressed, as in Embodiment 1, by the configuration in FIG. 2 or FIG. 3.

The route prediction system 100 according to the embodiment includes the observation unit 1 to observe, as in Embodiments 1 and 2, an area including a host vehicle and other moving vehicles, the signal processing unit 20 to generate, as in Embodiments 1 and 2, on the basis of the observation results, plural hypotheses that express collision avoidance models for at least two surrounding vehicles having collision possibilities, calculate predicted route confidence levels of the predicted routes corresponding to each of the hypotheses, and output the predicted route confidence levels, and the display unit 30 to display on a display screen the predicted routes that at least two surrounding vehicles can take and the confidence level corresponding to each of the predicted routes.

As described above, according to Embodiment 3, there is provided the observation unit 1 to observe a position of a host vehicle and positions and speeds of vehicles surrounding the host vehicle, the signal processing unit 20 to generate, on the basis of the observation results observed by the observation unit 1, plural hypotheses expressing collision avoidance models for at least two detected surrounding vehicle having collision possibilities, and calculate predicted route confidence levels of the predicted routes of the at least two surrounding vehicles corresponding to each of the plural hypotheses, and the display unit 30 to display the predicted routes and the predicted route confidence levels of the at least two surrounding vehicles on the basis of the predicted route confidence levels calculated by the signal processing unit 20. With such a configuration, the route prediction system 100 enables visual understanding of a predicted route of a surrounding vehicle. Further, by displaying the predicted route with a color corresponding to predicted route confidence level, a user can more accurately recognize the predicted route having a high predicted route confidence level.

Embodiment 4

In Embodiments 1 and 2, there is no function of modifying the analysis result of a predicted route when irregular vehicle motion occurs; however, it is also possible to have a format in which a confidence level of a hypothesis, a confidence level of a predicted route, and the like are modified using values such as an estimated speed and an accelerations of a surrounding vehicle estimated by the tracking processing. In Embodiments 1 and 2, the analysis result of a predicted route is outputted independently for each time; however, it is also possible to analyze the predicted route considering the continuity in the time direction. In Embodiment 4, a case of outputting analysis results different from those in Embodiments 1 and 2 will be described.

Figure 13:
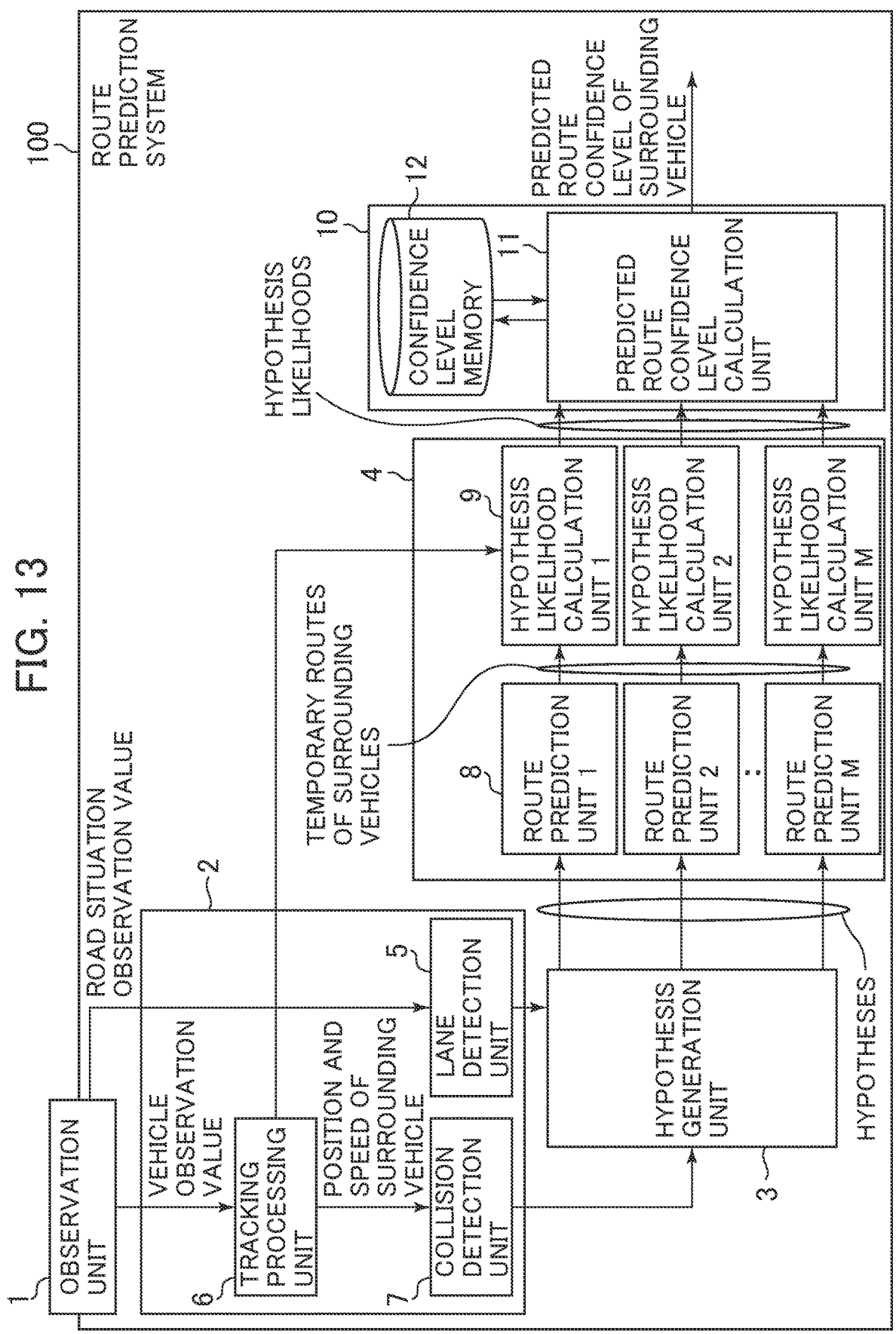
FIG. 13 is a diagram illustrating a configuration of a route prediction system 100 according to Embodiment 4 of the invention.

FIG. 13 is a configuration diagram illustrating a route prediction system 100 according to Embodiment 4. As illustrated in FIG. 13, the route prediction system 100 according to the embodiment includes the observation unit 1, the lane detection unit 5, the tracking processing unit 6, the collision detection unit 7, the hypothesis generation unit 3, the route prediction unit 8, the hypothesis likelihood calculation unit 9, the predicted route analysis unit 10, the predicted route confidence level calculation unit 11 provided in the predicted route analysis unit 10, and a confidence level memory 12. A hardware configuration that embodies the function of each unit in the route prediction system 100 illustrated in FIG. 13 is expressed by the configuration in FIG. 2 or FIG. 3 as in Embodiment 1.

The hypothesis likelihood calculation unit 9 in the likelihood calculation unit 4 calculates a hypothesis likelihood for each hypothesis on the basis of the temporary routes calculated by the route prediction unit 8. Here, the hypothesis likelihood is calculated by the following equation, where the likelihood evaluation value $P(Z(k)|\Phi_m)$ regarding the magnitude of collision, which is defined by Equation (19) or (20) in Embodiment 1, is multiplied by a likelihood evaluation value $P(Trj(k)|\Phi_m)$ regarding an avoidance trajectory.

$$P'(Z(k)|\Phi_m^k) = P(Z(k)|\Phi_m) P(Trj(k)|\Phi_m) \tag{25}$$

Here, to clarify the difference of time, a superscript k is added on the upper right of the hypothesis $\Phi_m$ (m=1, . . . , M) at the sampling time k.

A method of calculating the likelihood evaluation value regarding the avoidance trajectory in Equation (25) will be described below. First, a method of calculating the likelihood regarding the avoidance trajectory by the right steering will be described below. At the time of avoidance by the right steering, a speed is generated in the right direction with respect to the straight traveling direction. The likelihood of the right steering avoidance trajectory is calculated by Equation (26) using the lateral speed.

$$L_i = \frac{1}{\varepsilon_{v,k}^{(i)}} \tag{26}$$

where, $$\varepsilon_{v,k}^{(i)} = \frac{\left(\hat{x}_{s,k}^{(i)} - V_x\right)^2}{\sigma_{vx,k}^2} \tag{27}$$

$\hat{x}_{s,k}^{(i)}$: Estimated lateral speed obtained through tracking processing
$V_x$: Typical lateral speed at time of lane change
$\sigma_{vx,k}$: Standard deviation of estimated lateral speed error
The typical lateral speed at the time of lane change is set as a parameter.

Alternatively, using the feature that avoidance to the right results in the movement to the right adjacent lane, instead of Equation (27), Equation (28) may be used, in which the likelihood is higher as the lateral position is closer to the center line of the right adjacent lane.

$$\varepsilon_{v,k}^{(i)} = \left[\hat{x}_{x,k}^{(i)} - LINE_x \quad \hat{x}_{s,k}^{(i)} - V_x \right] (P_{x,k}^{(i)})^{-1} \begin{bmatrix} \hat{x}_{s,k}^{(i)} - LINE_x \\ \hat{x}_{s,k}^{(i)} - V_x \end{bmatrix} \tag{28}$$

where,
$LINE_x$: Lateral position of center line of right adjacent lane
$\hat{x}_{s,k}^{(i)}$: Estimated lateral position obtained through tracking processing
$P_{x,k}^{(i)}$: Estimated error covariance matrix for lateral position and speed obtained through tracking processing A likelihood can also be calculated for the left steering in the same idea as the avoidance to the right.

Next, a method of calculating the likelihood of the avoidance trajectory regarding braking avoidance will be described below. At the time of avoidance by braking, acceleration is generated with respect to the straight traveling direction. Thus, using the acceleration at the time of braking, the likelihood of the braking avoidance trajectory is calculated by Equation (29).

$$L_i = \frac{1}{\varepsilon_{a,k}^{(i)}} \tag{29}$$

where, $$\varepsilon_{a,k}^{(i)} = \frac{\left(\hat{\ddot{y}}_{s,k}^{(i)} - a_y\right)^2}{\sigma_{ay,k}^2} \tag{30}$$

$\ddot{y}_{n,k}^{(i)}$: Estimated longitudinal acceleration
$a_y$: Typical longitudinal acceleration at time of braking
94 $_{ay,k}$: Standard deviation of estimated longitudinal acceleration error
The typical acceleration at the time of braking is set as a parameter.

The estimated longitudinal acceleration and the standard deviation of the estimated longitudinal acceleration error can be calculated by the tracking processing based on the constant acceleration motion model. When the estimation accuracy of the acceleration is not sufficient, calculation of the likelihood is difficult; thus, a likelihood calculation method using speed will be described below.

$$L_i = \frac{\left(\hat{y}_{s,k}^{(i)} - \hat{y}_{s,k-n}^{(i)}\right)^2}{\sigma_{vy,k}^2} \quad (31)$$

where,
$\hat{y}_{s,k}^{(i)}$: Estimated longitudinal speed at sampling time k
$\hat{y}_{s,k-n}^{(i)}$: Estimated longitudinal speed at sampling time (k-n)
$\sigma_{vy,k}$: Standard deviation of estimated longitudinal speed error As in Equation (32), for all vehicles included in the hypothesis $\Phi_m$, the sum of the likelihoods based on respective collision avoidance models is calculated.

$$P(Trj(k) | \Phi_m) = \sum_{i \in I} L_i \quad (32)$$

Here, I means a set of vehicle numbers, i means a vehicle number, and j means a collision avoidance model number. For example, in the hypothesis 1 in FIG. 6, since the vehicle A steers to the right and the vehicle C brakes, a likelihood of the right steering avoidance trajectory is calculated for the vehicle A, a likelihood of braking avoidance trajectory is calculated for the vehicle C, and these likelihoods are added.

The predicted route analysis unit 10 calculates, with Equation (33), the hypothesis confidence level at the current sampling time k.

$$P(\Phi_m^k | Z(k)) = \frac{P^+(Z(k) | \Phi_m^k) P(\Phi_m^k | \Phi_m^{k-1}) P(\Phi_m^{k-1} | Z(k-1))}{\sum_{m=1}^{M} P'(Z(k) | \Phi_m^k) P(\Phi_m^k | \Phi_m^{k-1}) P(\Phi_m^{k-1} | Z(k-1))} \quad (33)$$

Here, the second term $P(\Phi_m^k | \Phi_m^{k-})$ in the numerator of Equation (33) represents the transition probability of the hypothesis from the sampling time (k-1) to the sampling time k, and it is set as a parameter unless prior information is given. Normally, it may be set to one. The third term is the hypothesis confidence level at the preceding sampling time (k-1), which is stored in the confidence level memory 12 and read out to be used.

The predicted route confidence level calculation unit 11 calculates, as the predicted route confidence level, an index representing the probability of occurrence of the predicted route of each vehicle. For example, the confidence level that the vehicle i takes the predicted route based on the collision avoidance model j is calculated by Equation (34). The left side of Equation (34) is the confidence level that the vehicle i takes the predicted route based on the collision avoidance model j.

$$P(l_{i,j} | Z(k)) = \frac{1}{c} \sum_{m=1}^{M} P'(Z(k) | \Phi_m^k) P(l_{i,j} | \Phi_m^k) P(\Phi_m^{k-1} | Z(k-1)) \quad (34)$$

Here, c is a constant, and $P(l_{i,j} | \Phi_m^k)$ is the same as $P(l_{i,j} | \Phi_m)$ in Equation (23).

Alternatively, as in Equation (24) in Embodiment 1, a value obtained by normalizing the confidence level adopting the predicted route based on the collision avoidance model j for the vehicle i with the sum of the confidence levels of all collision avoidance models may be a replacement as the predicted route confidence level. Since the other processing is the same as that in Embodiments 1 and 2, the description thereof will be omitted.

According to Embodiment 4 described above, the likelihood calculation unit 4 calculates a hypothesis likelihood on the basis of the estimated value and the estimated error covariance matrix outputted from the tracking processing unit 6, and the predicted route analysis unit 10 includes the predicted route confidence level calculation unit 11 that calculates, on the basis of the likelihood calculated by the likelihood calculation unit 4 and the hypothesis confidence level at the preceding sampling time, the predicted route confidence level indicating probability of occurrence of predicted routes of at least two surrounding vehicles for each predicted route. With such a configuration, the likelihood of the predicted route of each vehicle is modified according to the change in the motion of each vehicle, and the confidence level with continuity in the time direction is calculated; thus, in addition to the effects of Embodiments 1 and 2, more accurate information can be provided to a user.

Note that, in Embodiment 4, the description of the same processing as in Embodiments 1 and 2 is omitted, but any combinations of Embodiment 4 and Embodiments 1 and 2 are included in the present invention.

REFERENCE NUMERALS

1: observation unit, 2: vehicle detection unit, 3: hypothesis generation unit,
4: likelihood calculation unit, 5: lane detection unit, 6: tracking processing unit
7: collision detection unit, 8: route prediction unit,
9: hypothesis likelihood calculation unit, 10: predicted route analysis unit,
11: predicted route confidence level calculation unit, 12: confidence level memory,
20: signal processing unit, 30: display unit, 100: route prediction system,
201,203: reception device, 202,204: processing circuitry, 205: memory

The invention claimed is:
1. A route prediction system comprising:
a processor to execute a program;
a memory to store the program which, when executed by the processor, performs processes of
observing a position of a host vehicle and positions and speeds of vehicles surrounding the host vehicle,
based on results of the observation, detecting that at least two of the surrounding vehicles have a possibility of collision with each other,
generating a plurality of hypotheses for avoiding collision that may be taken by the at least two of the surrounding vehicles,
calculating a likelihood indicating probability of occurrence of each of the plurality of hypotheses,
analyzing predicted routes of the at least two of the surrounding vehicles based on the likelihood, and
outputting the analysis result; and
a display to display the predicted routes of the at least two of the surrounding vehicles, wherein the program performs, in the process of calculating the likelihood,
    a route prediction process, that is a process of predicting future positions of the at least two of the surrounding vehicles for each of the plurality of hypotheses, and
    a hypothesis likelihood calculation process, that is a process of calculating the likelihood indicating the probability of occurrence of each of the plurality of hypotheses, based on the future positions of the at least two of the surrounding vehicles.

2. The route prediction system according to claim 1, wherein the program performs, in the process of detection, processes of
    detecting a lane where the host vehicle is located, based on the observation results,
    tracking the surrounding vehicles based on results of the observation, and
    detecting, among the tracked surrounding vehicles, the at least two of the surrounding vehicles having a possibility of collision.

3. The route prediction system according to claim 1, wherein the program performs, in the hypothesis likelihood calculation process, a process of calculating, based on estimated speeds and estimated speed errors at a current time of the at least two surrounding vehicles, the likelihood indicating the probability of occurrence of each of the plurality of hypotheses.

4. The route prediction system according to claim 1, wherein the program performs, in the hypothesis likelihood calculation process, a process of calculating, based on estimated accelerations and estimated acceleration errors at a current time of the at least two surrounding vehicles, the likelihood indicating the probability of occurrence of each of the plurality of hypotheses.

5. The route prediction system according to claim 1, wherein the program performs, in the process of analyzing predicted routes, processes of selecting and outputting the predicted routes of the at least two of the surrounding vehicles based on the likelihood.

6. The route prediction system according to claim 1, wherein the program performs, in the process of analyzing predicted routes, a predicted route confidence level process, that is a process of calculating, based on the likelihood, a predicted route confidence level indicating probability of occurrence of each of the predicted routes of the at least two of the surrounding vehicles for each of the predicted routes.

7. The route prediction system according to claim 1, wherein the program performs, in the process of analyzing predicted routes, a predicted route confidence level process, that is a process of calculating, based on the likelihood, a confidence level of each of the plurality of hypotheses including the predicted routes of the at least two of the surrounding vehicles.

8. The route prediction system according to claim 6, wherein the program performs, in the predicted route confidence level process, a process of calculating the predicted route confidence level for each of the predicted routes, based on a confidence level of each of the plurality of hypotheses including the predicted routes of the at least two of the surrounding vehicles calculated at a preceding time.

9. The route prediction system according to claim 7, wherein the program performs, in the predicted route confidence level process, a process of calculating a predicted route confidence level for each of the predicted routes, based on a confidence level of each of the plurality of hypotheses including the predicted routes of the at least two of the surrounding vehicles calculated at a preceding time.

10. A route prediction system comprising:
    a processor to execute a program;
    a memory to store the program which, when executed by the processor, performs processes of
        observing a position of a host vehicle and positions and speeds of vehicles surrounding the host vehicle,
        generating, based on results of the observation, a plurality of hypotheses expressing collision avoidance models for at least two of the detected surrounding vehicles having a possibility of collision with each other, and
        calculating predicted route confidence levels of predicted routes of the at least two of the surrounding vehicles corresponding to each of the plurality of hypotheses; and
    a display to display, based on the predicted route confidence levels, the predicted routes and the predicted route confidence levels of the at least two of the surrounding vehicles.

11. A route prediction system comprising:
    a sensor to observe a position of a host vehicle and positions and speeds of vehicles surrounding the host vehicle;
    a processor to execute a program;
    a memory to store the program which, when executed by the processor, performs processes of
        generating, based on results of the observation by the sensor, a plurality of hypotheses expressing collision avoidance models for at least two of the detected surrounding vehicles having a possibility of collision with each other, and
        calculating predicted route confidence levels of predicted routes of the at least two of the surrounding vehicles corresponding to each of the plurality of hypotheses; and
    a display to display, based on the predicted route confidence levels, the predicted routes and the predicted route confidence levels of the at least two of the surrounding vehicles.

12. A route prediction system comprising processing circuitry configured
    to observe a position of a host vehicle and positions and speeds of vehicles surrounding the host vehicle,
    to detect the host vehicle and at least two of the surrounding vehicles having a possibility of collision with each other based on results of the observation,
    to generate a plurality of hypotheses for avoiding collision that may be taken by the at least two of the surrounding vehicles,
    to calculate a likelihood indicating probability of occurrence of each of the plurality of hypotheses,
    to analyze predicted routes of the at least two of the surrounding vehicles based on the likelihood, and
    to output the analysis result; and
    a display to display the predicted routes of the at least two of the surrounding vehicles, wherein
    the processing circuitry, in the calculation of the likelihood,
    predicts future positions of the at least two of the surrounding vehicles for each of the plurality of hypotheses, and
    calculates hypothesis likelihood indicating the probability of occurrence of each of the plurality of hypotheses, based on the future positions of the at least two of the surrounding vehicles.

13. The route prediction system according to claim 12, wherein the processing circuitry, in detection of the vehicles,
  detects a lane where the host vehicle is located, based on results of the observation,
  tracks the surrounding vehicles based on results the observation, and
  detects, among the tracked surrounding vehicles, the at least two of the surrounding vehicles having collision possibilities.

14. The route prediction system according to claim 12, wherein the processing circuitry, in the calculation of the hypothesis likelihood, calculates the likelihood indicating the probability of occurrence of each of the plurality of hypotheses, based on estimated speeds and estimated speed errors at a current time of the at least two surrounding vehicles.

15. The route prediction system according to claim 12, wherein the processing circuitry, in the calculation of the hypothesis likelihood, calculates the likelihood indicating the probability of occurrence of each of the plurality of hypotheses, based on estimated accelerations and estimated acceleration errors at a current time of the at least two surrounding vehicles.

16. The route prediction system according to claim 12, wherein the processing circuitry, in the analysis of the predicted routes, selects and outputs the predicted routes of the at least two of the surrounding vehicles based on the likelihood.

17. The route prediction system according to claim 12, wherein the processing circuitry, in the analysis of the predicted routes, calculates based on the likelihood, a predicted route confidence level indicating probability of occurrence of each of the predicted routes of the at least two of the surrounding vehicles for each of the predicted routes.

18. The route prediction system according to claim 12, wherein the processing circuitry, in the analysis of the predicted routes, calculates based on the likelihood, a confidence level of each of the plurality of hypotheses including the predicted routes of the at least two of the surrounding vehicles.

19. The route prediction system according to claim 17, wherein the processing circuitry, in the prediction of the route confidence level, calculates the predicted route confidence level for each of the predicted routes, based on a confidence level of each of the plurality of hypotheses including the predicted routes of the at least two of the surrounding vehicles calculated at a preceding time.

20. The route prediction system according to claim 18, wherein the processing circuitry, in the prediction of the route confidence level, calculates a predicted route confidence level for each of the predicted routes, based on a confidence level of each of the plurality of hypotheses including the predicted routes of the at least two of the surrounding vehicles calculated at a preceding time.

21. A route prediction system comprising processing circuitry configured
  to observe a position of a host vehicle and positions and speeds of vehicles surrounding the host vehicle,
  to generate, based on results of the observation, a plurality of hypotheses expressing collision avoidance models for at least two of the detected surrounding vehicles having a possibility of collision with each other, and
  to calculate predicted route confidence levels of predicted routes of the at least two of the surrounding vehicles corresponding to each of the plurality of hypotheses; and
a display to display, based on the predicted route confidence levels, the predicted routes and the predicted route confidence levels of the at least two of the surrounding vehicles.

22. A route prediction system comprising:
processing circuitry to observe a position of a host vehicle and positions and speeds of vehicles surrounding the host vehicle;
processing circuitry
  to generate, based on results of the observation, a plurality of hypotheses expressing collision avoidance models for at least two of the detected surrounding vehicles having a possibility of collision with each other, and
  to calculate predicted route confidence levels of predicted routes of the at least two of the surrounding vehicles corresponding to each of the plurality of hypotheses; and
a display to display, based on the predicted route confidence levels, the predicted routes and the predicted route confidence levels of the at least two of the surrounding vehicles.

23. A route prediction system comprising:
a sensor to observe a position of a host vehicle and positions and speeds of vehicles surrounding the host vehicle;
processing circuitry
  to generate, based on results of the observation by the sensor, a plurality of hypotheses expressing collision avoidance models for at least two of the detected surrounding vehicles having a possibility of collision with each other, and
  to calculate predicted route confidence levels of predicted routes of the at least two of the surrounding vehicles corresponding to each of the plurality of hypotheses; and
a display to display, based on the predicted route confidence levels, the predicted routes and the predicted route confidence levels of the at least two of the surrounding vehicles.

\* \* \* \* \*